(No Model.)

J. W. VOLTZ.
COTTON PLANTER AND FERTILIZER DISTRIBUTER.

No. 353,336. Patented Nov. 30, 1886.

WITNESSES:

INVENTOR:
J. W. Voltz
BY Munn & Co.
ATTORNEYS.

UNITED STATES PATENT OFFICE.

JAMES WILLIAM VOLTZ, OF MARION JUNCTION, ALABAMA.

COTTON-PLANTER AND FERTILIZER-DISTRIBUTER.

SPECIFICATION forming part of Letters Patent No. 353,336, dated November 30, 1886.

Application filed February 25, 1886. Serial No. 193,240. (No model.)

*To all whom it may concern:*

Be it known that I, JAMES WILLIAM VOLTZ, of Marion Junction, in the county of Dallas and State of Alabama, have invented certain new and useful Improvements in Cotton-Planters and Fertilizer-Distributers, of which the following is a full, clear, and exact description.

Reference is to be had to the accompanying drawings, forming a part of this specification, in which similar letters of reference indicate corresponding parts in all the figures.

Figure 1:
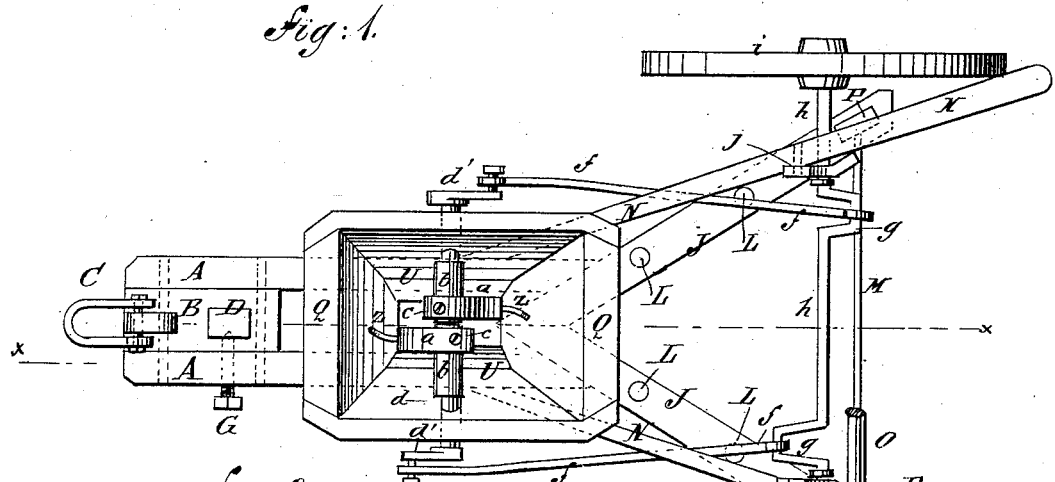
Figure 3:
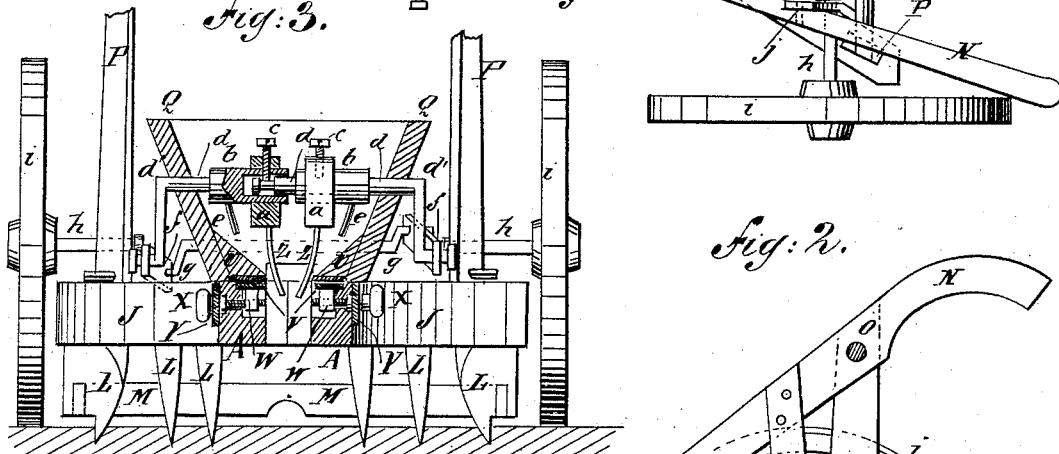
Figure 2:
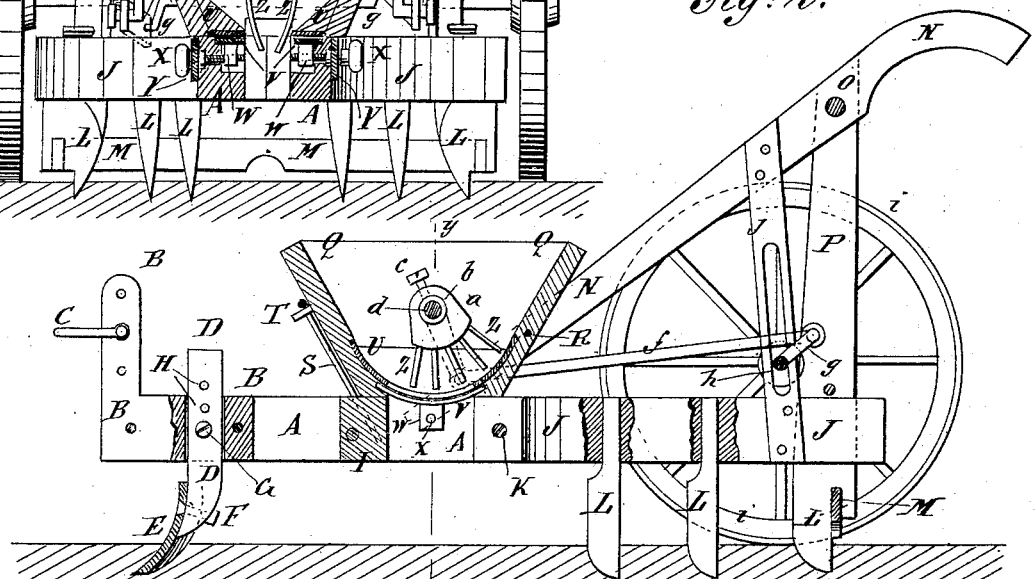

Figure 1 is a plan view of one of my improved cotton-planters and fertilizer-distributers, part being broken away. Fig. 2 is a sectional side elevation of the same, taken through the line $x\,x$, Fig. 1. Fig. 3 is a sectional front elevation of the same, taken through the line $y\,y$, Fig. 2.

The object of this invention is to provide cotton-planters and fertilizer-distributers constructed in such a manner that cotton-seeds can be planted and fertilizers distributed accurately and uniformly, and which at the same time shall be simple in construction and readily adjusted and controlled.

The invention consists in the construction and combination of various parts of the cotton-planter and fertilizer-distributer, as will be hereinafter fully described, and then pointed out in the claims.

A are the beams, the forward ends of which are bolted to the opposite sides of the cast-iron nose-piece B. The forward part of the nose-piece B projects upward, and has a number of holes formed through it to receive the hook or clevis C, to which the draft is applied, so that the point of draft attachment can be readily raised or lowered, as may be desired.

Through the body of the nose-piece B is formed a rectangular hole to receive the standard D, to the lower end of which is secured a plow, E, to open a channel in the ground to receive the seed or fertilizer. The plow E is secured in place by a screw or bolt, F, passing through it and through the lower end of the standard D. The standard D is secured in place by a conical-pointed screw, G, which passes through the beam A and through the side of the nose-piece B, and enters a recess, H, formed in the side of the standard D to receive the point of the said screw. Several recesses H are formed in the standard D to receive the point of the screw G, so that the said standard can be readily raised and lowered to open a shallower or a deeper channel to receive the seed or fertilizer, as may be required. The middle parts of the beams A are bolted to each other and to a block, I, interposed between them.

J are the beams of the coverer, which incline toward each other toward their forward ends, are beveled upon the inner sides of their forward ends, and are secured to each other and to and between the rear ends of the beams A by a bolt, K. The beams J are perforated to receive the shanks of the teeth L, the forward ones of which are designed to fill the channel and cover the seed or fertilizer, and the following teeth L are designed to pulverize the soil at the sides of the said channel. The rear teeth, L, are made wider than the others, and have slots or recesses in their rear sides to receive the ends of the covering-board M, the lower edge of which is concaved to smooth off and give a proper shape to the top of the row.

N are the handles, the forward ends of which are secured to the outer sides of the rear parts of the beams A, and their rear parts are connected by a round, O, attached to them and to the upper ends of the uprights P. The lower ends of the uprights P are secured to the rear ends of the coverer-beams J, and may be upward extensions of the rear teeth, L.

Q is the hopper, which rests upon the beams A and the block I, between the forward parts of the handles N. The rear lower part of the hopper Q is secured to the lower parts of the handles N by screws R, passing through the said handles and into the said hopper. The forward part of the hopper Q is secured in place by a staple, S, driven into the block I, and a pin or screw, T, passing through the said staple and into the said hopper. In the bottom of the hopper Q is secured a concaved metallic plate, U, which has a wide slot formed through it, through which the cotton-seed or fertilizer is discharged.

The size of the discharge-opening is regulated by two plates, V, placed in recesses below the said plate U, and having nuts W formed upon or attached to their lower sides to receive screws X, passing in through the beams A and swiveled to plates Y, attached to the outer sides of the said beams A, so that by turning the said screws the adjustable plates V can be moved toward or from each other, to allow less or more of the seed or fertilizer to escape, as may be desired.

The cotton-seed or fertilizer is pushed out through the discharge-opening in the bottom of the hopper Q by fingers Z, attached to collars $a$, placed upon the sleeves $b$, where they are secured in place adjustably by set-screws $c$, or other suitable means. The sleeves $b$ are cast upon or otherwise secured to the inner parts of the shafts $d$ of two cranks, $d'$. The end of one of the shafts $d$ projects beyond the end of its sleeve $b$ and enters the adjacent end of the other sleeve $b$, which projects beyond the end of its shaft $d$. The projecting end of the longer shaft $d$ has an annular groove formed in it to receive the end of the set-screw $c$, that secures the collar to its sleeve, as shown in Fig. 3, so that the two crank-shafts can rock independent of each other, but cannot separate.

To the lower sides of the outer parts of the sleeves $b$ are attached single fingers $e$, to assist in pushing the seed or fertilizer toward the middle part of the bottom of the hopper Q, so that it will be readily pushed out by the fingers Z. The crank-shafts $d$ rock in bearings in the sides of the hopper Q, and to their crank-arms are pivoted the forward ends of the connecting-bars $f$, the rear ends of which are pivoted to cranks $g$, formed upon the shaft $h$.

To the ends of the crank-shaft $h$ are attached wheels $i$, so that the said crank-shaft will be revolved to operate the distributers by the revolution of the wheels $i$. The crank-shaft $h$ revolves in slots in the upright bars $j$, the lower ends of which are attached to the coverer-beams J, and their upper ends are attached to the handles N. By this construction the wheels $i$ can adjust themselves to the surface of uneven ground, so that the distributers will be operated with certainty and the seed or fertilizer will be discharged in uniform quantities.

The cranks $g$ are made shorter than the cranks $d'$, so that the distributers will be rocked by the revolution of the crank-shaft $h$ and wheels $i$. The cranks $g$ project in opposite directions, so that one of the distributers $a$ Z will be swung forward as the other is swung rearward, to make the said distributers more effective in pushing out the cotton-seed or fertilizer.

Having thus fully described my invention, I claim as new and desire to secure by Letters Patent—

1. In a planter, the combination, with a supporting-frame and a hopper mounted thereon, of two independently-moving distributers journaled therein, and means for operating the said distributers alternating in opposite directions, substantially as herein shown and described.

2. In a cotton-planter and fertilizer-distributer, the combination, with the hopper Q, the beams A J, and the handles N, of the distributers Z $a$, the crank-shafts $d$, carrying the distributers, and the connecting-bars $f$, crank-shaft $h$, wheels $i$, and slotted uprights $j$, substantially as herein shown and described, whereby the seed or fertilizer will be distributed with certainty and uniformity, as set forth.

3. In a cotton-planter and fertilizer-distributer, the distributers made substantially as herein shown and described, and consisting of the collars $a$, having fingers Z, and secured by sleeves $b$ and set-screws $c$ to crank-shafts $d$, whereby the said distributers can move in opposite directions, as set forth.

4. In a planter, the combination, with the coverer-bars J, the slotted standards $j$, and the handles N, of the hopper Q, the distributers Z $a$, provided with the cranks $d$, the shaft $h$, provided with the cranks $g$ and working in the slots of the bars J, the wheels $i$, and the connecting-bars $f$, substantially as herein shown and described.

JAMES WILLIAM VOLTZ.

Witnesses:
R. S. WETMORE,
CHAS. S. COOPER.